US008902454B2

(12) United States Patent
Liu et al.

(10) Patent No.: US 8,902,454 B2
(45) Date of Patent: Dec. 2, 2014

(54) METHODS FOR PRINTING FROM MOBILE DEVICES

(75) Inventors: Xu Liu, Cupertino, CA (US); Sergey Chemishkian, Cupertino, CA (US); Jamey Graham, San Jose, CA (US); John Barrus, Menlo Park, CA (US); Bradley Rhodes, Alameda, CA (US); Kathrin Berkner, Los Altos, CA (US); Mike Griffin, Redwood City, CA (US); Jonathan J. Hull, San Carlos, CA (US)

(73) Assignee: Ricoh Co., Ltd., Tokyo (JP)

( * ) Notice: Subject to any disclaimer, the term of this patent is extended or adjusted under 35 U.S.C. 154(b) by 931 days.

(21) Appl. No.: 12/579,210

(22) Filed: Oct. 14, 2009

(65) Prior Publication Data

US 2011/0085196 A1   Apr. 14, 2011

(51) Int. Cl.
*G06F 3/12* (2006.01)
*G06F 21/60* (2013.01)

(52) U.S. Cl.
CPC ............ *G06F 3/1204* (2013.01); *G06F 3/1292* (2013.01); *G06F 3/1228* (2013.01); *G06F 21/608* (2013.01)
USPC ............................ 358/1.15; 358/1.9; 358/539

(58) Field of Classification Search
USPC ................................................. 358/1.1–3.29
See application file for complete search history.

(56) References Cited

U.S. PATENT DOCUMENTS

| | | | |
|---|---|---|---|
| 6,144,997 A | 11/2000 | Lamming et al. | |
| 6,421,716 B1 | 7/2002 | Eldridge et al. | |
| 6,476,927 B1 | 11/2002 | Schwarz, Jr. | |
| 6,515,988 B1 | 2/2003 | Eldridge et al. | |
| 6,735,622 B1 | 5/2004 | Andreoli et al. | |
| 6,965,933 B2 | 11/2005 | Haartsen | |
| 7,184,159 B2 | 2/2007 | Bergstrand | |
| 7,239,868 B2 | 7/2007 | Furukawa et al. | |
| 7,240,009 B2 | 7/2007 | Jost et al. | |
| 7,409,434 B2 | 8/2008 | Lamming et al. | |
| 7,444,394 B2 | 10/2008 | Igarashi et al. | |
| 7,505,168 B2 | 3/2009 | Simonds et al. | |
| 7,508,954 B2 | 3/2009 | Lev | |
| 2002/0147646 A1* | 10/2002 | Ogura et al. | 705/14 |
| 2003/0086109 A1 | 5/2003 | Fitch | |
| 2003/0182246 A1* | 9/2003 | Johnson et al. | 705/76 |

(Continued)

FOREIGN PATENT DOCUMENTS

| | | |
|---|---|---|
| EP | 0646857 A1 | 4/1995 |
| EP | 0653700 A1 | 5/1995 |

(Continued)

OTHER PUBLICATIONS

Michaels, Philip, "Soonr Cloud-Computing App Gets Down to Business," <http://www.macworld.com/article/1137889/soonr.html>, Dated Jan. 4, 2009, 2 pages.

(Continued)

*Primary Examiner* — Benny Q Tieu
*Assistant Examiner* — Marcellus Augustin
(74) *Attorney, Agent, or Firm* — Blakely, Sokoloff, Taylor & Zafman LLP

(57) ABSTRACT

A method and apparatus for printing from mobile devices are described. In one embodiment, the method comprises outputting a machine-readable code associated with the printer; receiving rendered print data specified by the mobile device that scanned and decoded the machine-readable code; and printing the rendered print data.

18 Claims, 9 Drawing Sheets

(56) References Cited

U.S. PATENT DOCUMENTS

| | | |
|---|---|---|
| 2003/0197887 A1* | 10/2003 | Shenoy et al. ............... 358/1.15 |
| 2005/0210129 A1 | 9/2005 | Feng et al. |
| 2006/0221363 A1* | 10/2006 | Roth et al. ..................... 358/1.6 |
| 2008/0081666 A1* | 4/2008 | Masera et al. ................ 455/557 |
| 2008/0084578 A1* | 4/2008 | Walker et al. ............... 358/1.15 |
| 2008/0222190 A1 | 9/2008 | Kosaka |
| 2008/0239364 A1 | 10/2008 | Nelson et al. |
| 2009/0064300 A1 | 3/2009 | Bagepalli et al. |

FOREIGN PATENT DOCUMENTS

| | | |
|---|---|---|
| EP | 0738957 A2 | 10/1996 |
| EP | 0749064 A1 | 12/1996 |
| EP | 0777176 A1 | 6/1997 |
| WO | WO 2007/105577 A1 | 9/2007 |

OTHER PUBLICATIONS

"Mobile Printing Apps," <http://www.printeron.com/apps.html>, Accessed Dec. 28, 2012, 1 page.

Sage, Simon, "RIM Partners With HIP for Cloud Printing," <http://www.intomobile.com/2009/05/04/rim-partners-with-hp-for-cloud-printing/>, Dated May 4, 2009, 3 pages.

* cited by examiner

METHODS FOR PRINTING FROM MOBILE DEVICES

FIELD OF THE INVENTION

Embodiments of the present invention are related to printing documents; more particularly, embodiments of the present invention are related to controlling a printer with a mobile device to cause the printer to print a document.

BACKGROUND OF THE INVENTION

Ever since printing devices became available on networks rather than on one's desk, users have long sought easy connections and configurations with these devices. With the advent of WiFi came the desire to print to any printer one could see. For example, if a person is having coffee in a coffee shop and wants to print to a printer in the room, the process for doing so is complicated. In order to use such a printer, the user's device (e.g., a laptop or a cell phone) must be configured to work with a printer. Also, the user's device must be able to communicate with the printer. If the printer is on a network, the user's device must be able to communicate with the printer on the network. A WiFi access code may be required to access the network the printer is on. More importantly, however, are the security issues associated with sending a document to a publically available printer. Such a person is not going to be comfortable using a printer if there is a possibility that the document being printed may be obtained by other parties.

SUMMARY OF THE INVENTION

A method and apparatus for printing from mobile devices are described. In one embodiment, the method comprises outputting a machine-readable code associated with the printer; receiving rendered print data specified by the mobile device that scanned and decoded the machine-readable code; and printing the rendered print data.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
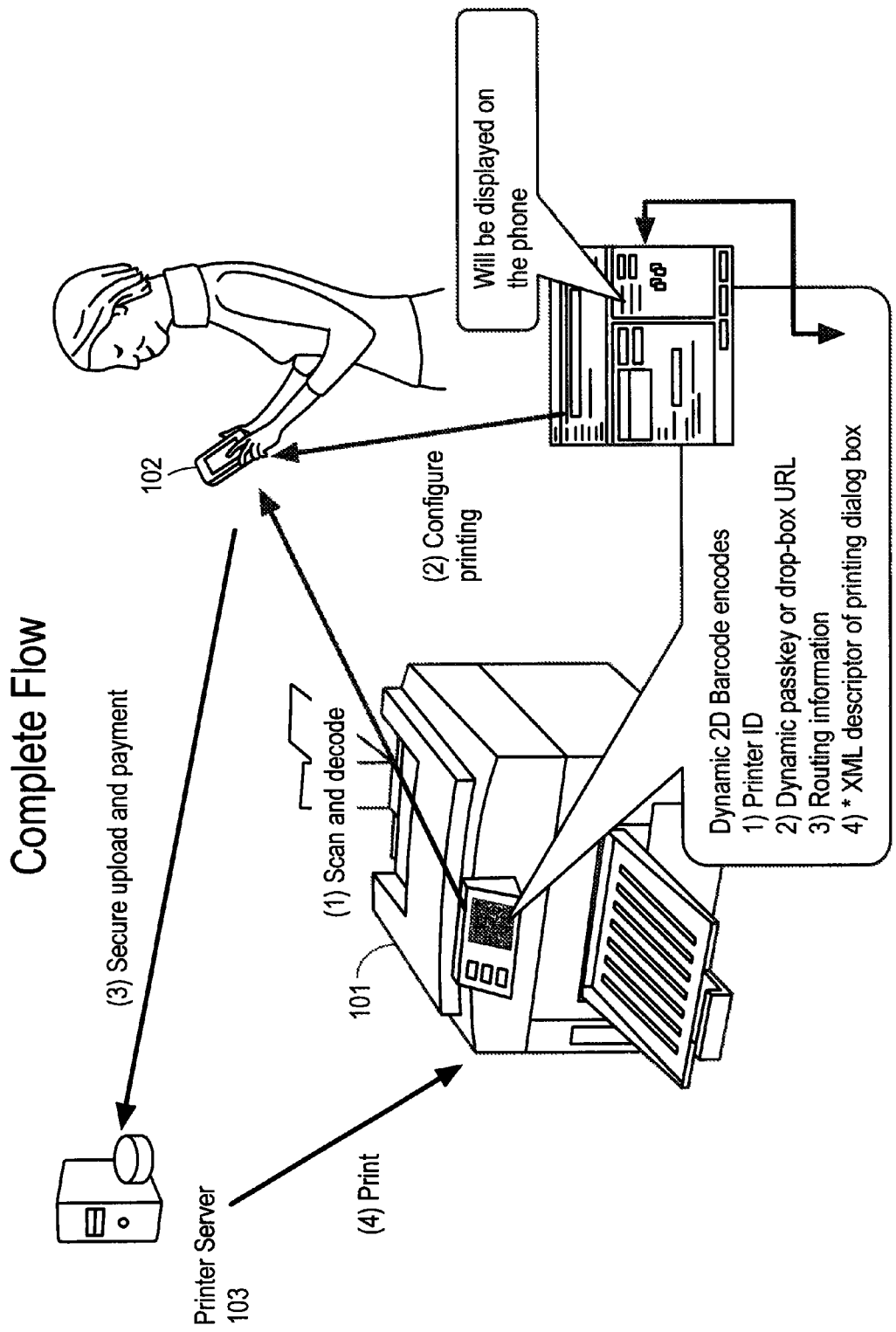
FIG. 1 illustrates an environment in which interaction occurs between a printer and mobile device to print a document.

Techniques are disclosed that enable the interaction between a user with a mobile device and a printer to print a document. This is accomplished by establishing a transient association between the mobile device and the printer that allows the user to print the document. These techniques provide both an easy-to-use interface for configuring a device to print while addressing the security issues associated with transferring important files. In one embodiment, the interactions between the mobile device and the printer occurs through an intermediary (e.g., a local service).

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

FIG. 1 illustrates an environment that illustrates the operations of the printer and mobile device (e.g., cell phone, laptop, web camera). Note that the printer may be a standalone printer, or part of another system such as, for example, an MFP, a copier, or other device with printing capability.

Figure 2:
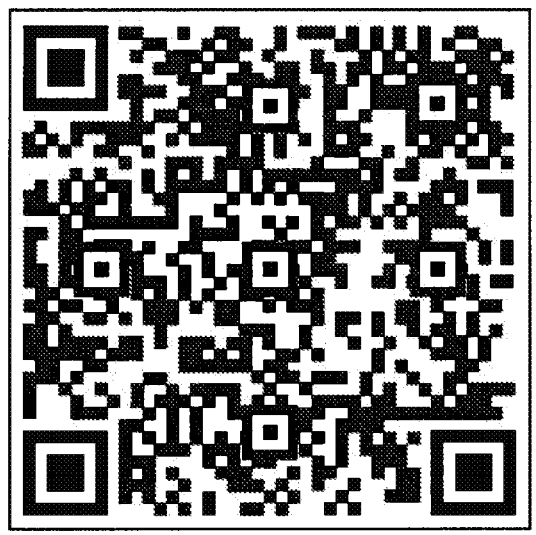
FIG. 2 illustrates an example of a dynamic 2D barcode.

Referring to FIG. 1, printer 101 displays a machine-readable code (e.g., dynamic 2D barcode). A dynamic 2D barcode is a barcode that changes over time or generated upon request. Each time a new dynamic 2D barcode is generated, it is different from all the previously generated ones. An example of a dynamic 2D barcode is shown in FIG. 2. The 2D barcode can be displayed on the control panel/touchscreen of the printer or be printed from the printer. In one embodiment, the 2D barcode is displayed in response to a user depressing a button on the printer. The button may be on the touchscreen of the printer.

Alternatively, if printer 101 does not have a display, printer 101 prints a sheet of paper (or other print media) with the machine-readable code on it. Again, this may occur in response to the user depressing a button on the printer.

In one embodiment, the 2D barcode encodes the following information: 1) a passkey which changes on a periodic basis (e.g., a 10 minute basis, a ½ hour basis, an hourly basis, or every time a new barcode is displayed in response to a user depressing a button); 2) a printer ID; 3) routing information to the printer (e.g., MMS, Bluetooth, HTTP, etc.); and 4) an optional descriptor (e.g., an XML descriptor) of a printer dialog box.

In one embodiment, the machine-readable code encodes printing cost information. Also note that, in one embodiment, the machine-readable code and/or drop box is only temporary and is only good to use for a limited period of time after which time it expires. Also, the machine-readable code may only permit one-time use. In one embodiment, the machine-readable code encodes a public key with which data may be encrypted before sending to the printer. In another embodiment, the machine-readable code encodes a symmetric key with which data may be encrypted before sending to the printer.

Once the user has been presented with the machine-readable code, the user uses a mobile device 102 (e.g., cell phone) to scan and decode the barcode when the user wants to print data such as a document. This occurs using the camera of mobile device 102. With the decoded information, the mobile device renders the printer dialog box on its display according to the decoded XML descriptor and allows the user to configure the printing job. Configuring the print job includes specifying the document (e.g., file, spreadsheet, presentation, text, photos, pictures) to print and may include specifying how the user wants the document printed (e.g., double-sided vs. single-sided, lighter, darker, number of copies, binding, halftone, etc.).

Once the user has completed configuring the print job, mobile device 102 uses its communication interface (e.g., a data network interface) to upload the print job to printer server 103 together with the passkey and printer ID using the routing information. The uploading may occur after pressing a button on the mobile device. In one embodiment, if one route is blocked, then other routes are used.

In one embodiment, mobile device 102 also uploads payment information to print server 103 to pay for the costs of the print job. This may include account information and/or credit/debit card information.

Print server 103 verifies that the passkey has recently been issued to the printer identified by the printer ID and then assigns this print job to printer 101. In one embodiment, print server 103 uses the upload print job information to obtain the document to be printed. In one embodiment, the document is included in the uploaded print job. In another embodiment, the uploaded print job specifies a location (e.g., a URL or other resource location information) from which print server 103 obtains the document.

After obtaining the document to be printed, print server 103 renders the print data corresponding to the document and then sends the rendered print data to printer 101 for printing. Printer server 103 also uses uploaded payment information to charge the user's account for printing costs.

Figure 3:
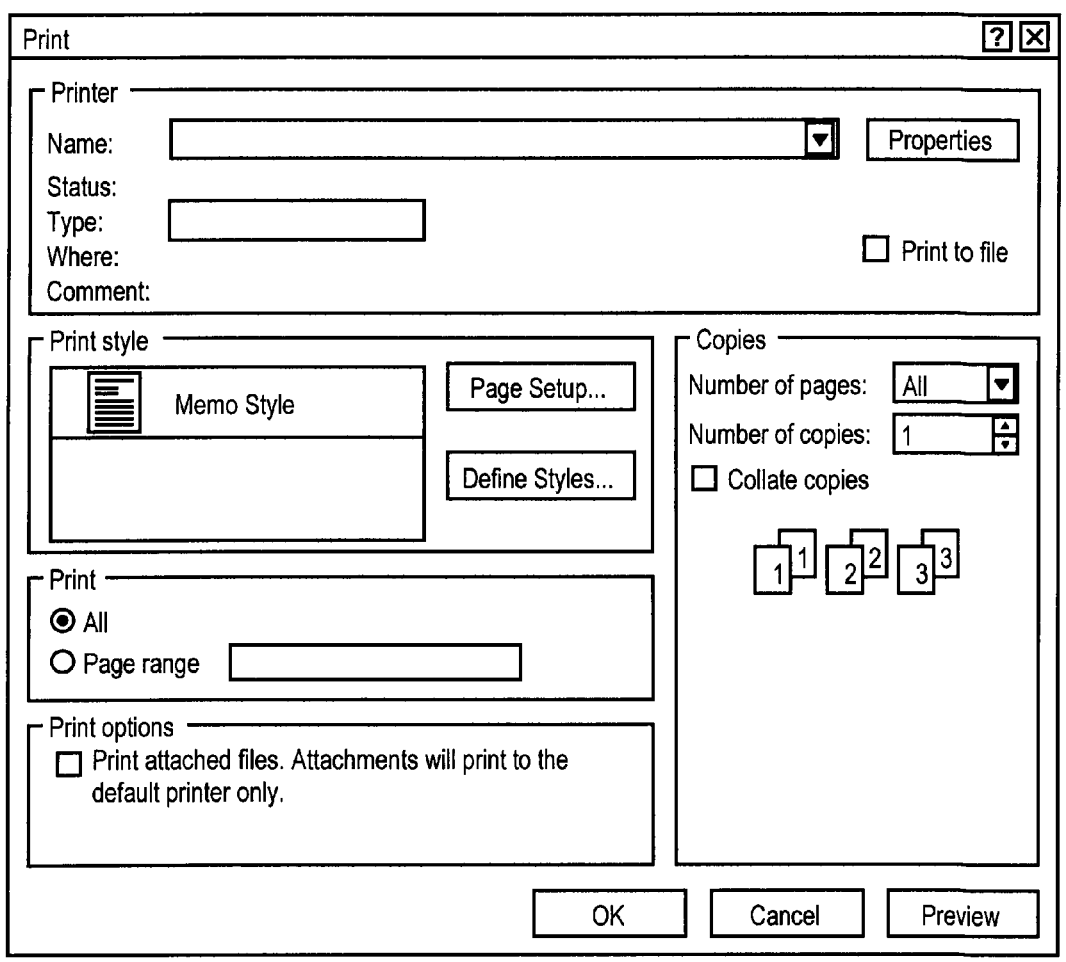
FIG. 3 an example of a printer dialog box.

FIG. 3 is an example of a printer dialog box. In one embodiment, the printer dialog box includes buttons to "Browse" to look up a document, "Select URL" to pick a document, and "Go" to send the selection. That is, a user can select either "Browse" to choose a file from mobile device 102 to print or press "Select URL" to choose the URL pointing to a document the user would like to print. If the user chooses the "Select URL" button, the user enters a URL for the desired document and then presses the "Go" button. After a few seconds, the uploaded document prints on the printer.

Figure 4:
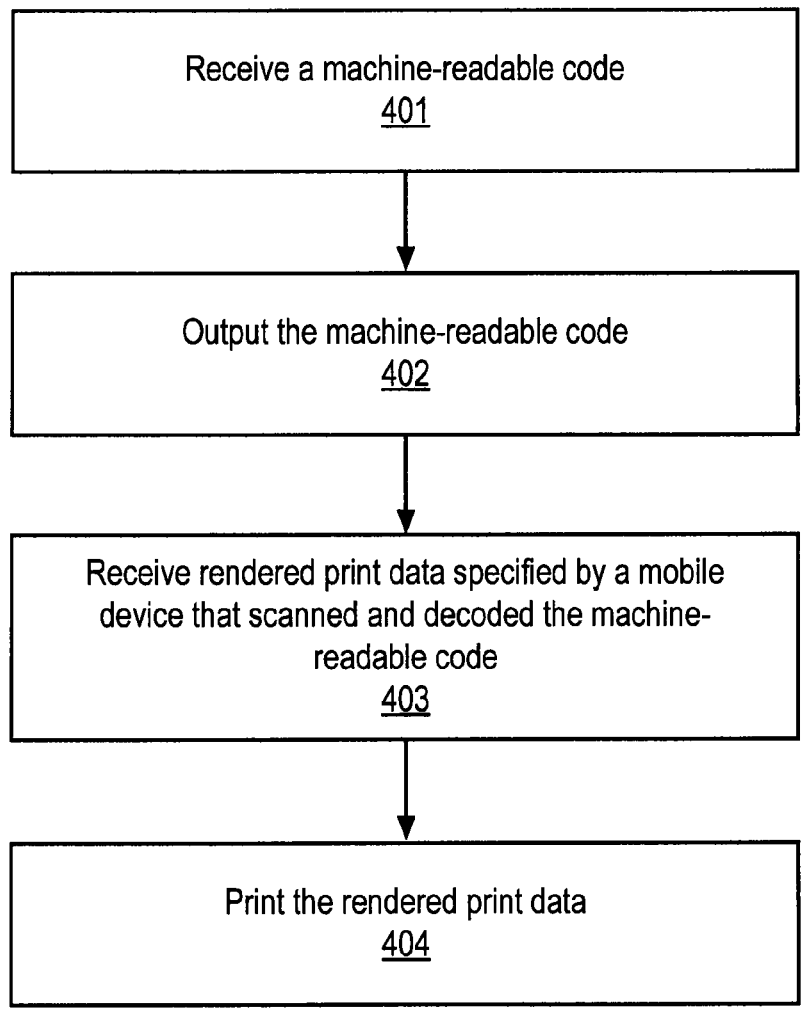
FIG. 4 is a flow diagram of one embodiment of a process performed by the printer.

FIG. 4 is a flow diagram of one embodiment of a process performed by the printer. The process is performed by processing logic that may comprise hardware (circuitry, dedicated logic, etc.), software (such as is run on a general purpose computer system or a dedicated machine), or a combination of both. In one embodiment, the processing logic is part of a printer, such as printer 101 in FIG. 1.

The process begins with processing logic of the printer optionally receiving a machine-readable code (e.g., a barcode) (processing block 401). In one embodiment, the machine-readable code is received from a remote location over a networked connection. The remote location may be a web service. In one embodiment, the machine-readable code is randomly generated at the remote location and sent to the printer. Alternatively, the printer could generate the machine-readable code itself. In one embodiment, the machine-readable code consists of one part that is randomly generated and one part that is associated with the printer (e.g., a Printer ID).

The machine-readable code is associated with a printer. The association may be that it encodes an ID of the printer. In one embodiment, the machine-readable code is only valid for a predetermined period of time (e.g., 1 minute, ½ hour, an hour); if the machine-readable code is not used to print a document with the printer during that time period, then the machine-readable code expires and is no longer valid.

Next, processing logic of the printer outputs the machine-readable code (processing block 402). In one embodiment, processing logic outputs the machine-readable code by displaying the machine-readable code on a touchscreen or other display of the printer of the printer. Alternatively, processing logic outputs the machine-readable code by printing the machine-readable code on a print media (e.g., paper) using a print engine of the printer. Outputting the machine-readable code is performed in response to a user depressing a button, switch or other interface element on the printer.

Subsequently, processing logic of the printer receives rendered print data specified by the mobile device (subsequent to scanning and decoding the machine-readable code) (processing block 403) and prints the rendered print data (processing block 404). In one embodiment, the printer receives the rendered print data by downloading the print data from a remote location (e.g., a web service). This may occur in response to processing logic of the printer monitoring a remote location (e.g., a drop box) and determining that a print job exists for the printer at that location. In another embodiment, the printer receives the document and renders the print data itself.

Figure 5:
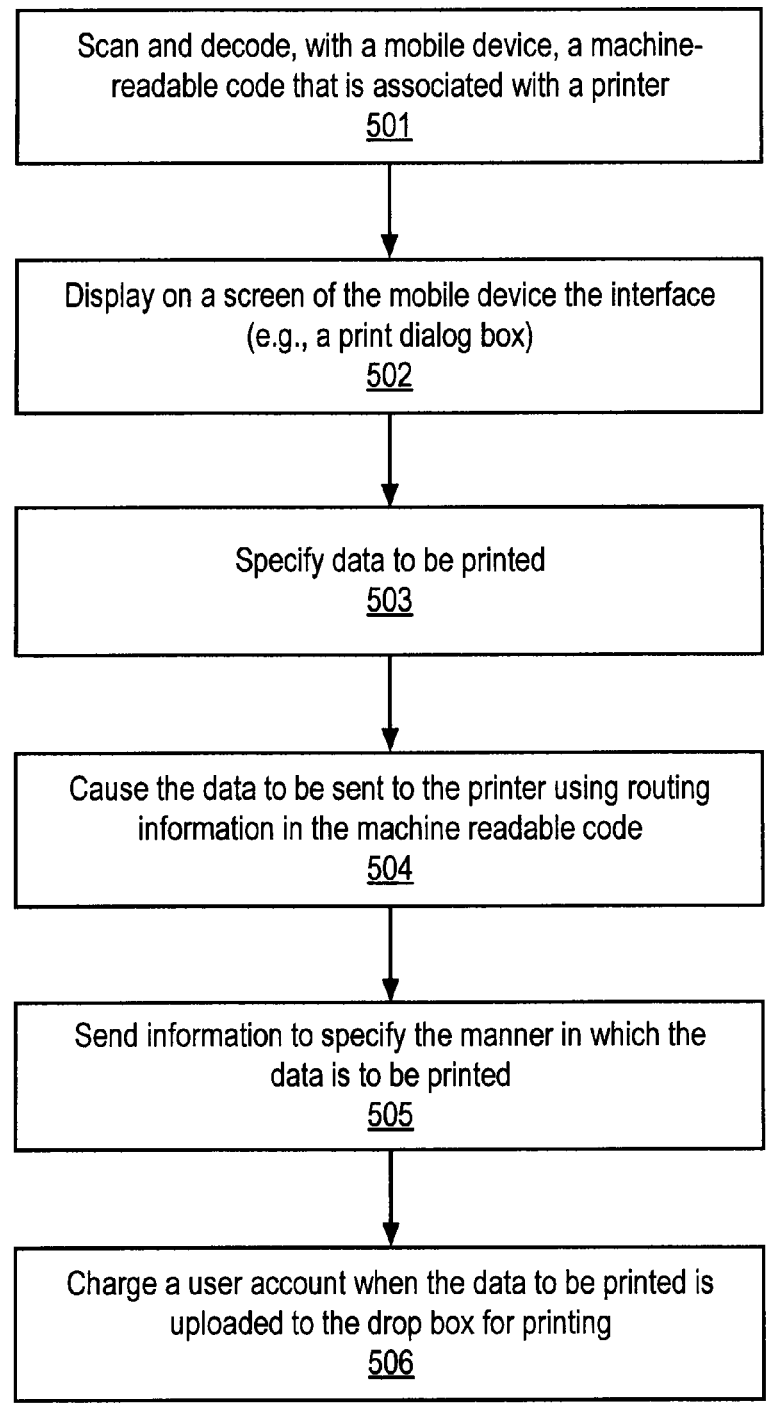
FIG. 5 is a flow diagram of one embodiment of a process for causing data to be printed.

FIG. 5 is a flow diagram of another embodiment of the interaction process for causing data to be printed. The process is performed by processing logic that may comprise hardware (circuitry, dedicated logic, etc.), software (such as is run on a general purpose computer system or a dedicated machine), or a combination of both. In one embodiment, the process is performed by a mobile device, such as the mobile device of FIG. 1, or a laptop computer.

The process begins by processing logic scanning (with a camera of the mobile device) and decoding (with a processor of the mobile device) a machine-readable code that is associated with a printer (processing block 501). In one embodiment, scanning and decoding the machine-readable code is displayed on a screen of the printer. In another embodiment, scanning and decoding the machine-readable code is printed on a print medium printed by the printer.

Next, processing logic displays on a screen of the mobile device the interface (e.g., a print dialog box) (processing block 502). In one embodiment, the interface is generated from decoded information from the machine-readable code and dynamically rendered on the mobile device. In another embodiment, the interface is obtained from a location remote with respect to the mobile device using decoded information (e.g., a link, URL, etc.) from the machine-readable code.

Using the interface on the screen of the mobile device, processing logic specifies data to be printed (processing block 503) and causes the data to be sent to the printer using routing information encoded in the machine readable code (processing block 504). In one embodiment, this is done by sending information indicating the data to print from the mobile device to an intermediary (e.g., a web service, a print server, etc.) which forwards a rendered version of the data to the printer for printing over a network connection between the intermediary and the printer. The information may be sent by uploading the data to a URL or other resource locator and having the printer access that location to obtain the data.

Also, processing logic optionally sends information to specify the manner in which the data is to be printed (processing block 505).

Afterwards, processing logic charges a user account when the data to be printed is uploaded to the drop box for printing (processing block 506).

Note that the transfers of information described herein may be encrypted for better security. In such a case, the mobile device, printer and print server have encryption and/or decryption capabilities. In one embodiment, the machine-readable code encodes a public key with which data may be encrypted before sending to the printer. In another embodiment, the machine-readable code encodes a symmetric key with which data may be encrypted before sending to the printer.

Alternative Embodiments

There are a number of alternative embodiments to the interactions described above. These are described below.

Figure 6:
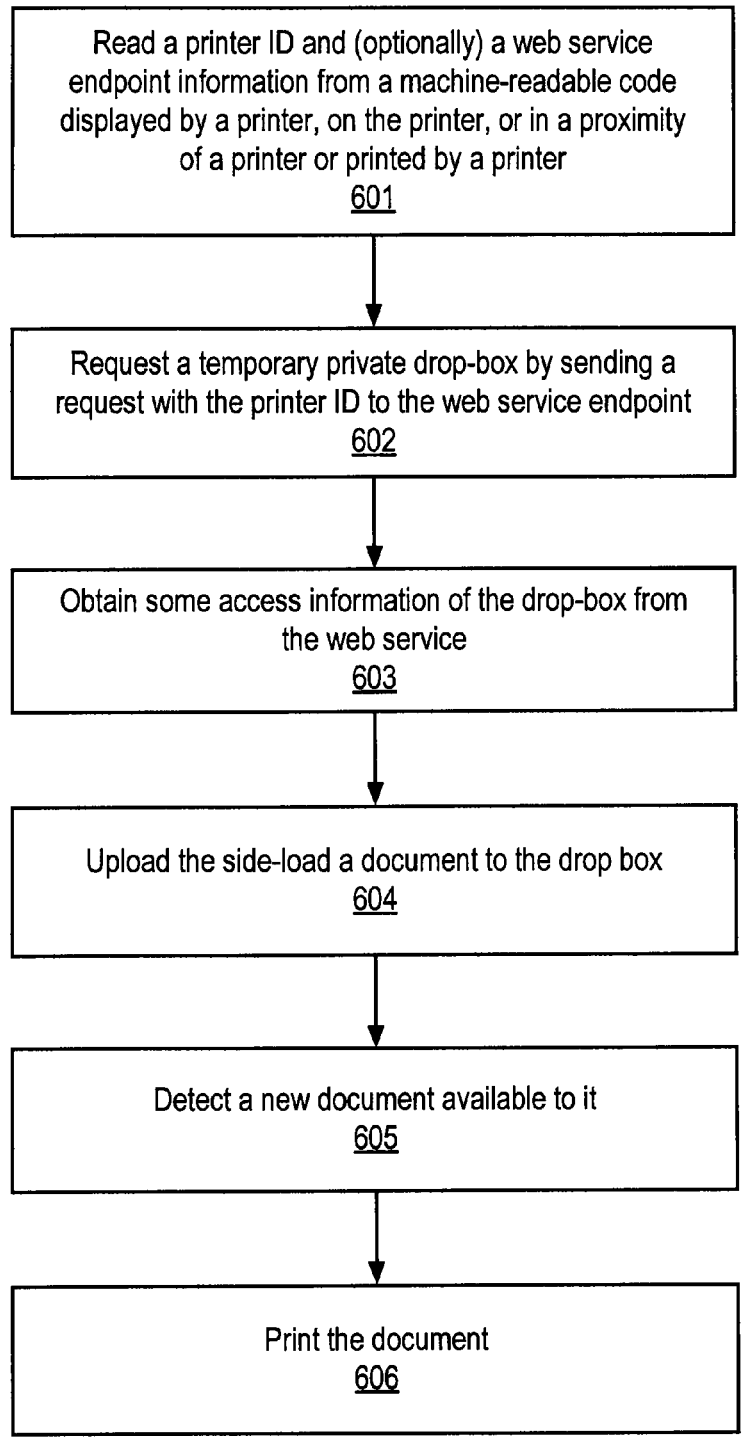
FIG. 6 is a flow diagram of an alternative embodiment of an interaction process for having a mobile device interact with a printer to print a document.

FIG. 6 is a flow diagram of another embodiment of an interaction process. The process is performed by processing logic that may comprise hardware (circuitry, dedicated logic, etc.), software (such as is run on a general purpose computer system or a dedicated machine), or a combination of both.

Referring to FIG. 6, the processing begins with a mobile device reading a printer ID and (optionally) web service endpoint information from a machine-readable code (e.g., QR code) displayed by a printer, on the printer, or in a proximity of a printer (processing block 601). The machine-readable code may be static or dynamic.

Next, processing logic of the mobile device requests a temporary private drop-box "in the cloud" by sending a request with the printer ID to the web service endpoint (e.g., via HTTP, SMS, email, XMPP, etc.) (processing block 602).

Then, processing logic in the mobile device gets some access information for the drop-box (e.g., a URL, an SMS number, etc.) from the web service (processing block 603).

Processing logic in the mobile device uploads or side-loads a document to the drop box (processing block 604), and processing logic in the printer detects a new document available to it (processing block 605) and prints the document (processing block 606). In one embodiment, the printer detects the new document via a pull or push. This may occur without the drop box ID being revealed to the printer.

Figure 7:
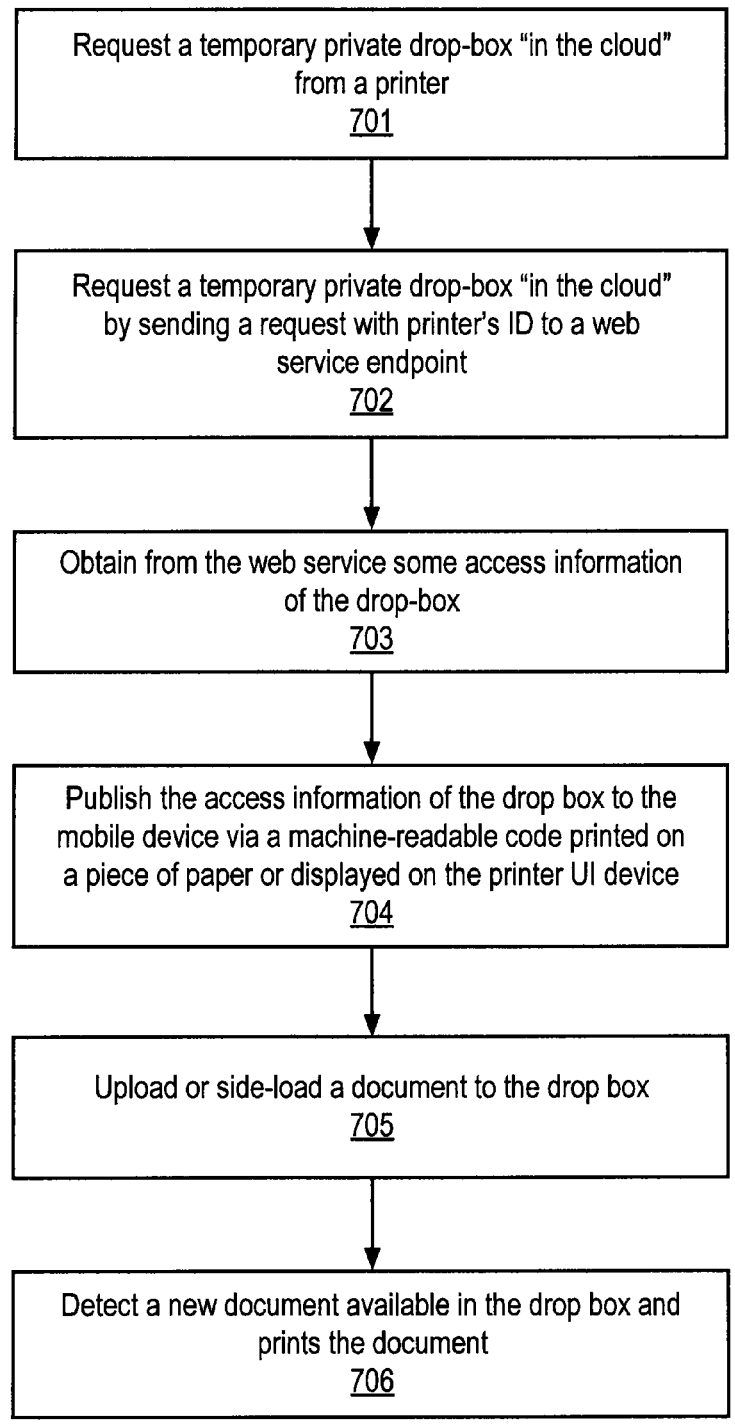
FIG. 7 is a flow diagram of another alternative embodiment of an interaction process for having a mobile device interact with a printer to print a document.

FIG. 7 is a flow diagram of yet another embodiment of an interaction process. The process is performed by processing logic that may comprise hardware (circuitry, dedicated logic, etc.), software (such as is run on a general purpose computer system or a dedicated machine), or a combination of both.

Referring to FIG. 7, the process begins by a user requesting a temporary private drop-box "in the cloud" from a printer (processing block 701). This may occur in response to a user activating a push button on the printer. In response, processing logic in the printer requests a temporary private drop-box "in the cloud" by sending a request with printer's ID to a web service endpoint (via HTTP, SMS, email, Jabber, etc.) (processing block 702).

Then, processing logic in the printer obtains some access information for the drop-box from the web service (processing block 703). This may be a URL, SMS number, or some other resource locator information.

Processing logic in the printer publishes the access information of the drop box to the mobile device via a machine-readable code printed on a piece of paper or displayed on the printer user interface device (processing block 704).

After the access information has been published, processing logic in the mobile device uploads or side-loads a document to the drop box (processing block 705).

Subsequently, processing logic in the printer detects a new document available in the drop box and prints the document (processing block 706). This may be via pull or push.

Note that the drop box in the cloud can be associated with flexible access policies (expiration time, one-time PIN, fee) and optionally with extra services (translate, convert file type, print from URL, etc.)

Note that in the flow diagrams described above, printer and mobile device are temporarily bound via the inbox. The implementations of FIGS. 6 and 7 differ mainly in the device capabilities and drop box, printer, and device identity privacy. Namely, in FIG. 6, the printer identity is revealed to the mobile device via the machine-readable code, and it is passed to the web service by the device. The device identity is not revealed to the printer. In FIG. 7, the printer identity is reported to the cloud via the inbox request, but it is not revealed to the mobile device. The device identity is not revealed to the printer. The printer publishes the URL to the mobile device via the print token.

Figure 8:
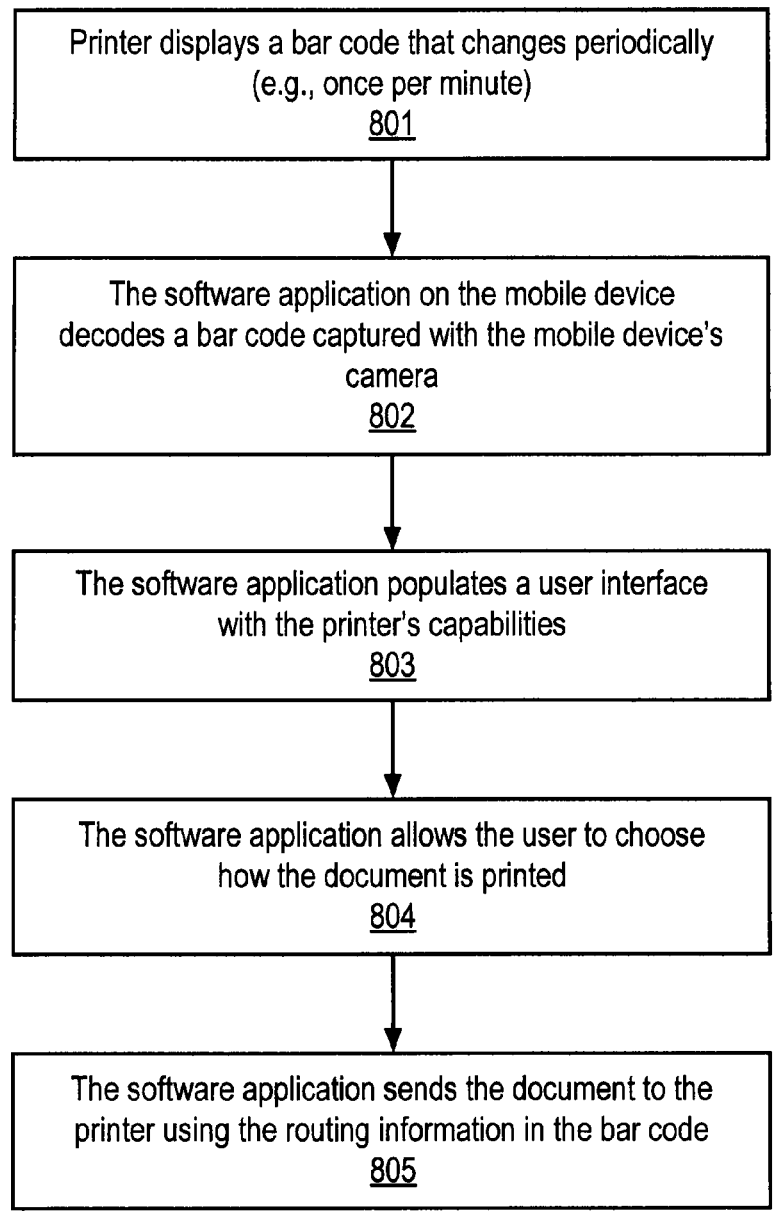
FIG. 8 is a flow diagram of yet another alternative embodiment of an interaction process for having a mobile device interact with a printer to print a document.

FIG. 8 is a flow diagram of still another embodiment of an interaction process. The process is performed by processing logic that may comprise hardware (circuitry, dedicated logic, etc.), software (such as is run on a general purpose computer system or a dedicated machine), or a combination of both.

Referring to FIG. 8, a printer displays a machine-readable code that changes periodically (e.g., once per minute, once per user request for a code, etc.) (processing block 801). In one embodiment, machine-readable code includes: pass key generated uniquely on the printer that guarantees the user scanned the machine-readable code; routing information specifying how to connect the phone to the printer (e.g., Bluetooth (with pairing info), MMS or SMS batching, http); and XML description of the printer's capabilities (e.g., duplex, page sizes, etc.). In one embodiment, the machine-readable code encodes a public key with which data may be encrypted before sending to the printer. In another embodiment, the machine-readable code encodes a symmetric key with which data may be encrypted before sending to the printer.

Then, a software application on the mobile device decodes a machine-readable code captured with the mobile device's camera (processing block 802), populates a user interface with the printer's capabilities (processing block 803), allows the user to choose how the document is printed (processing block 804), and sends the document to the printer using the routing information in the bar code (processing block 805). Alternatively, the software may be a web browser displaying web pages, as opposed to an application.

Note that the printer can print the document format directly (e.g., some printers can directly print pdf), and the communication path (e.g., multiple MMS messages or http) can directly connect to the printer, then a web service is not needed. However, if neither of these constraints are satisfied, then a web service can be used as a buffer store or to render the document for printing.

Possible Service Monetization

Note that the above processes may include service monetization. For example, in one embodiment, when a document is uploaded or side-loaded to the drop box, the user account at the web service provider is charged accordingly. In another embodiment, when a document is downloaded by the printer for subsequent print, a part of the charged fee is credited to the printer host account (e.g., Kinko's).

Other monetization schemes include requiring a user to enter account information (e.g., Paypal service; store account info) or credit card information into the printer to get the machine-readable code or with their uploaded information.

An Example of a Printer

Figure 9:
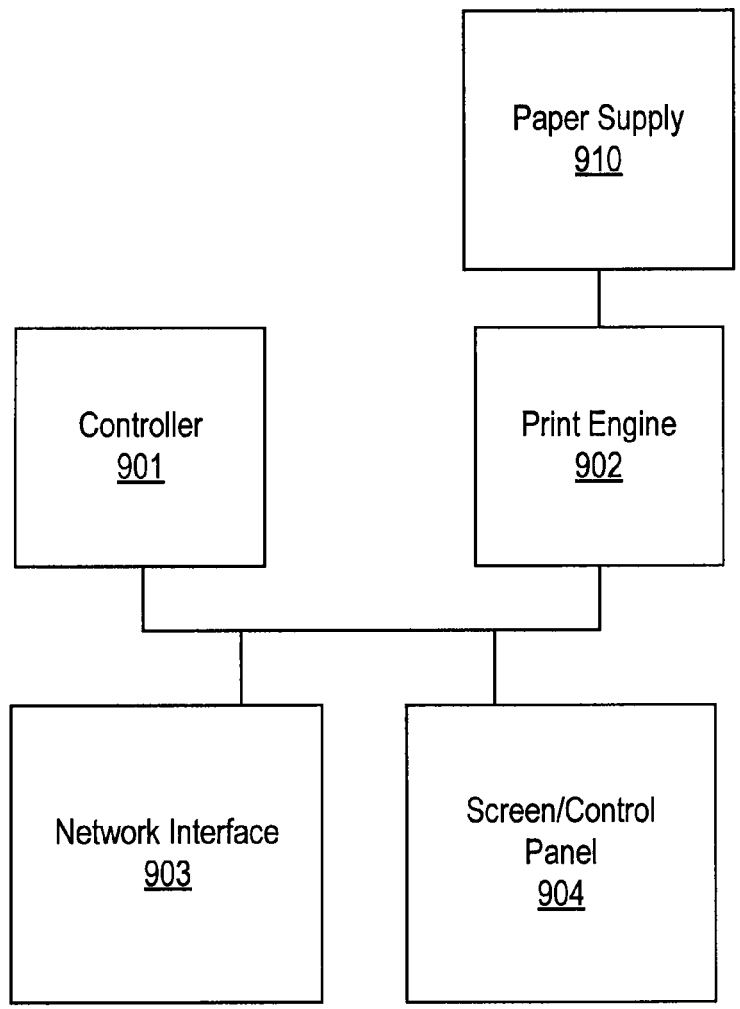
FIG. 9 is a block diagram of a printer.

FIG. 9 is a block diagram of one embodiment of a printer. Referring to FIG. 9, the printer includes a controller 901 (e.g., one or more processors or micro controllers) that controls the operations of the other components. The printer also includes a print engine 902 that prints documents under control of controller 901 using paper supply 910. The printer also includes a screen/control panel 904 to allow user input (via one or more buttons) and to display the machine-readable code. The printer also includes a network interface 903 to communicate over a network, including to receive machine-readable codes (if generated remotely) and to receive print data.

ADVANTAGES

Embodiment of this mobile print process has the following advantages. For security, embodiments use a temporary unguessable upload directory for print documents, i.e. a drop box, that is created on demand on a remote server, and associated with a printer locality or identity. The access information of this drop box is published to a mobile device in electronic form, or via a machine readable code (printed or displayed QR code). Because of the temporary user-unguessable nature of the upload, a user can feel secure in sending the document for printing. Optionally, the printer may present a cryptographic key that the mobile device may use to encrypt information being sent to the printer or web service. Such a key could be used to encrypt communications that would otherwise be sent over a channel that does not support encryption, e.g. one that uses plain HTTP or MMS.

The use of expirations and timeouts helps limit users to people who are currently in physical proximity to a printer (e.g., current customers in a coffee shop). This helps prevent spammers from discovering a code that could otherwise be used to print unwanted advertisements from anywhere on the network.

Also, the mobile device does not have to be on the same network with the printer in order to print, does not have to reveal it's identity to the printer. Optionally, the printer may not reveal it's identity to the device.

The techniques described herein also allows for recovery and/or displaying printing costs. Service monetization is performed at the time of document upload to the drop box. Fee redistribution between the web service provider and the printer owner is possible.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in them recite only those features regarded as essential to the invention.

We claim:

1. A method for a mobile device to use a printer to print data, the method comprising:

outputting, via the printer, a machine-readable code associated with the printer, wherein the machine-readable code encodes at least printer identification data, a dynamic drop-box locator or password, routing information that specifies routing to the printer, and a printer dialog box;

receiving, at the printer, rendered print data from a remote printer server, the rendered print data corresponding to data selected at the mobile device to be printed and uploaded to the remote printer server by the mobile device that scanned and decoded the machine-readable code, wherein the rendered print data being routed to the printer from the remote print server based at least in part on the printer identification data encoded in the machine-readable code; and printing the rendered print data using the printer.

2. The method defined in claim 1 further comprising receiving the machine-readable code from the remote printer server over a networked connection.

3. The method defined in claim 1 wherein the machine-readable code is randomly generated.

4. The method defined in claim 1 wherein outputting a machine-readable code associated with a printer comprises displaying the machine-readable code on a screen of the printer.

5. The method defined in claim 1 wherein outputting a machine-readable code associated with a printer comprises printing the machine-readable code on a print media using a print engine of the printer.

6. The method defined in claim 1 wherein outputting a machine-readable code associated with a printer is performed in response to a button being depressed on the printer.

7. The method defined in claim 1 further comprising monitoring the remote printer server to determine if a print job exists corresponding to the machine-readable code.

8. The method defined in claim 1 wherein the machine-readable code encodes a cryptographic key.

9. A method for a mobile device to use a printer to print data, the method comprising:
outputting, via the printer, a machine-readable code associated with the printer, wherein the machine-readable code encodes at least printer identification data, a dynamic drop-box locator or password, routing information that specifies routing to the printer, and printing cost;
receiving, at the printer, rendered print data from a remote printer server, the rendered print data corresponding to data selected at the mobile device to be printed and uploaded to the remote printer server by the mobile device that scanned and decoded the machine-readable code, wherein the rendered print data being routed to the printer from the remote print server based at least in part on the printer identification data encoded in the machine-readable code; and
printing the rendered print data using the printer.

10. A non-transitory computer readable storage media storing instructions thereon which when executed by a system cause the system to perform a method comprising:
outputting, via a printer, a machine-readable code associated with the printer, wherein the machine-readable code encodes at least printer identification data, a dynamic drop-box locator or password, routing information that specifies routing to the printer, and a printer dialog box;
receiving, at the printer, rendered print data from a remote printer server, the rendered print data corresponding to data selected at a mobile device to be printed and uploaded to the remote printer server by the mobile device that scanned and decoded the machine-readable code, wherein the rendered print data being routed to the printer from the remote print server based at least in part on the printer identification data encoded in the machine-readable code; and
printing the rendered print data using the printer.

11. The non-transitory computer readable storage media defined in claim 10 wherein outputting a machine-readable code associated with a printer comprises displaying the machine-readable code on a screen of the printer or printing the machine-readable code on a print media using a print engine of the printer.

12. A printing device comprising:
a print engine;
a screen; and
a controller coupled to control the print engine and the screen, the controller being operable to cause the screen to display, at the printing device, a machine-readable code associated with the printing device, wherein the machine-readable code encodes at least identification data for the printing device to enable a remote printer server to route rendered print data to the printing device based at least in part on the identification data, a dynamic drop-box locator or password, routing information that specifies routing to the printer, and a printer dialog box, wherein the rendered print data corresponds to data selected at a mobile device to be printed and uploaded to the remote printer server by the mobile device that scanned and decoded the machine-readable code.

13. The printing device defined in claim 12 wherein the machine-readable code comprises a bar code.

14. The printing device defined in claim 12 wherein the machine readable code comprises information to enable a device scanning the machine-readable code to specify data to be printed by the print engine.

15. The printing device defined in claim 14 further comprising a communication interface to receive the data to print specified by the device scanning the machine-readable code.

16. The printing device defined in claim 12 wherein the machine-readable code is randomly generated.

17. The printing device defined in claim 12 wherein the machine-readable code encodes one or more of a group consisting of: one or more capabilities of the printer and printing costs.

18. A printing device comprising:
a print engine; and
a controller coupled to control the print engine, the controller being operable to cause the print engine to print a machine-readable code, at the printing device, to enable a device scanning the machine-readable code to specify data to be printed by the print engine via the printing device, wherein the machine-readable code encodes at least identification data for the printing device to enable a remote printer server to route rendered print data to the printing device based at least in part on the identification data, a dynamic drop-box locator or password, routing information that specifies routing to the printer, and a printer dialog box, and wherein the rendered print data corresponds to the specified data to be printed by the print engine and uploaded to the remote printer server in response to the device scanning the machine-readable code.

* * * * *